(12) United States Patent
Ouyang et al.

(10) Patent No.: US 9,207,400 B2
(45) Date of Patent: Dec. 8, 2015

(54) T-SHAPE POLARIZATION BEAM SPLITTER BASED ON PHOTONIC CRYSTAL WAVEGUIDE

(71) Applicant: SHENZHEN UNIVERSITY, Shenzhen, Guangdong (CN)

(72) Inventors: Zhengbiao Ouyang, Shenzhen (CN); Xin Jin, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 37 days.

(21) Appl. No.: 14/372,025

(22) PCT Filed: Jan. 9, 2013

(86) PCT No.: PCT/CN2013/070254
§ 371 (c)(1),
(2) Date: Jul. 14, 2014

(87) PCT Pub. No.: WO2013/104306
PCT Pub. Date: Jul. 18, 2013

(65) Prior Publication Data
US 2014/0355927 A1    Dec. 4, 2014

(30) Foreign Application Priority Data

Jan. 13, 2012  (CN) .......................... 2012 1 0064948

(51) Int. Cl.
*G02B 6/10* (2006.01)
*G02B 6/126* (2006.01)
(Continued)

(52) U.S. Cl.
CPC ................. *G02B 6/126* (2013.01); *B82Y 20/00* (2013.01); *G02B 1/005* (2013.01); *G02B 6/1225* (2013.01); *G02B 6/2773* (2013.01); *G02B 2006/1215* (2013.01)

(58) Field of Classification Search
CPC ........... G02B 6/10; G02B 6/126; G02B 6/122
USPC ..................................................... 385/11, 129
See application file for complete search history.

(56) References Cited

U.S. PATENT DOCUMENTS

| | | | |
|---|---|---|---|
| 2002/0041749 A1* | 4/2002 | Johnson ................ | B82Y 20/00 385/129 |
| 2005/0053321 A1* | 3/2005 | Lidorikis ............. | G02B 6/1225 385/15 |

(Continued)

FOREIGN PATENT DOCUMENTS

| | | |
|---|---|---|
| CN | 101251627 A | 8/2008 |
| CN | 101840024 A | 9/2010 |

(Continued)

OTHER PUBLICATIONS

International Search Report of PCT Patent Application No. PCT/CN2013/070254 issued on Apr. 25, 2013.

*Primary Examiner* — Kaveh Kianni

(57) ABSTRACT

A photonic crystal waveguide T-polarization beam splitter, comprising a photonic crystal waveguide with a completely forbidden band; after the input end (1) of the photonic crystal waveguide inputs an incident wave in any polarization direction into the polarization beam splitter, a TE component is outputted from a TE output end (2), and a TM component is outputted from the TM output end (3) of the beam splitter. The polarization beam splitter has a small size, high polarization and high light transmission efficiency, facilitates integration and has high efficiency, is suitable for large scale optical path integration, and achieves the functions of polarizing and beam splitting for different wavelengths.

6 Claims, 4 Drawing Sheets

(51) Int. Cl.
  *G02B 6/122* (2006.01)
  *G02B 1/00* (2006.01)
  *B82Y 20/00* (2011.01)
  *G02B 6/27* (2006.01)
  *G02B 6/12* (2006.01)

(56) References Cited

U.S. PATENT DOCUMENTS

2008/0124037 A1    5/2008   Noda et al.

2012/0183250 A1*   7/2012   Cheben .................. G02F 1/365    385/2
2013/0028553 A1*   1/2013   Jia .......................... B82Y 20/00    385/11
2014/0366647 A1*   12/2014   Steinhardt ............. B82Y 20/00    73/862.381

FOREIGN PATENT DOCUMENTS

CN    101881862 A    11/2010
CN    101887145 A    11/2010

* cited by examiner

T-SHAPE POLARIZATION BEAM SPLITTER BASED ON PHOTONIC CRYSTAL WAVEGUIDE

FIELD OF THE INVENTION

The invention relates to the field of micro optical polarization beam splitter, in particular, to a tiny optical polarization beam splitter based on photonic crystal technology.

BACKGROUND OF THE INVENTION

Conventional polarization beam splitters are large in volume, and can not be used in the optical integrated circuits. However, micro optical devices including polarization beam splitters can be manufactured based on photonic crystals. Up to now, there are two methods, one of which is that a photonic crystal with a TE photonic bandgap and a TM transmission band, or a TM photonic bandgap and a TE transmission band are used to achieve the polarization separation of waves. This kind of polarization beam splitter can only be used as separate photonic crystal device, since the transmittance and degree of polarization are poor, and it is difficult to integrate it into other photonic crystal devices. The other is that different relative coupling lengths are designed in order to couple light waves with different polarization states into different waveguides by means of long-distance coupling between waveguides, utilizing the method of periodic coupling and odd-even state alternation between the waveguides. The polarization beam splitters obtained by the two methods above, although the volume thereof has been much smaller than that of conventional polarization beam splitters, still have a relative large volume.

SUMMARY OF THE INVENTION

The object of the present invention is to overcome the shortcomings in the prior arts, and to provide a T-shape polarization beam splitter based on photonic crystal waveguides formed in a photonic crystal with a complete photonic bandgap, to be convenient for integration with high efficiency and a small dimension.

The object of the present invention is realized through the following technical schemes.

The T-shape polarization beam splitter based on photonic crystal waveguides according to the present invention includes photonic crystal waveguides formed in a photonic crystal with a complete photonic bandgap, wherein after the incident wave with any polarization direction is inputted into the polarization beam splitter via the input port of the photonic crystal waveguides, TE wave is outputted from the TE output port, while the TM wave is outputted from TM output port of the beam splitter.

Dielectric defect rods are arranged in the photonic crystal waveguides, the refractive index for the e-light is more than that for the o-light in the dielectric defect rods in the waveguides, and the optical axis of the square dielectric defect rods in the waveguide is parallel to the photonic crystal waveguide plane and perpendicular to the propagating direction of the wave.

The direction of the optical axis of the round dielectric defect rods in the waveguide is consistent with that of the background dielectric rods.

The number of the dielectric defect rods in the waveguides is 1 or 2 or 3 or 4 or 5 or 6.

The photonic crystal waveguides are a two-dimensional photonic crystal waveguides, and includes two-dimensional photonic crystal waveguides with tellurium dielectric material, two-dimensional photonic crystal waveguides with honeycomb structure, two-dimensional photonic crystal waveguides with triangular lattice and two-dimensional photonic crystal waveguides with various irregular shapes.

The photonic crystal waveguides have a structure formed by removing 1 or 2 or 3 or 4 rows of the dielectric rods from the photonic crystal.

The photonic crystal waveguide plane is perpendicular to the axis of the background dielectric rods in the photonic crystal.

Compared with the prior arts, the present invention has the following advantages:

(1) The structure has the advantages of small volume, high degree of polarization, high light transmission efficiency, and being suitable for large-scale optical integrated circuits;
(2) The present invention can completely realize the polarization separation function via two kinds of dielectric defect rods in a small volume, thus it is convenient for optical integration and high efficient;
(3) The present invention can realize the polarization beam splitting function for different wavelengths by the method of scaling the lattice constant and other geometric parameters utilizing the scaling property of photonic crystals.

BRIEF DESCRIPTION OF THE DRAWINGS

As shown in FIG. 1, the initial signal for the present device is inputted from the left port "1", port "2" outputs TE light wave, and port "3" outputs the TM light wave. "4" is the background tellurium dielectric rods, the direction of the optical axis thereof is outwards vertical to the paper plane, and the radius thereof is R=0.3568 a. "5" is a set of square dielectric defect rods, the direction of the optical axis thereof is parallel to the paper plane and perpendicular to the lower surface of the cube, the side length thereof is L=0.575 a, and the position center of each defect rod is the same as that of the corresponding circle of background rod deleted. "6" is a set of round dielectric defect rods, the direction of the optical axis thereof is consistent with that of the background dielectric rods, the radius thereof is R=0.175 a, and the position center thereof is the same as that of the corresponding circle of background rod deleted.

As shown in FIG. 2, the parameters of the device are: (all values are required to be multiplied by the lattice constant a)

$L_1$=1 (lattice constant)

$L_2$=3 (distance between the circle centers of the nearest background dielectric rods on the two walls of the waveguides)

$L_3$=0.575 (side length of the square dielectric defect rods in the waveguides)

$L_4$=1.5 (distance between the centers of the round dielectric defect rods and that of the nearest background dielectric rods)

$L_5$=1 (distance between the centers of two nearest square dielectric defect rods, and distance between die centers of square dielectric defect rods and that of the nearest background dielectric rods)

$L_6$=1 (distance between the round dielectric defect rods)

$R_1$=0.3568 (radius of the background tellurium dielectric rods)

$R_2$=0.175 (radius of the round dielectric defect rods)

Figure 3:
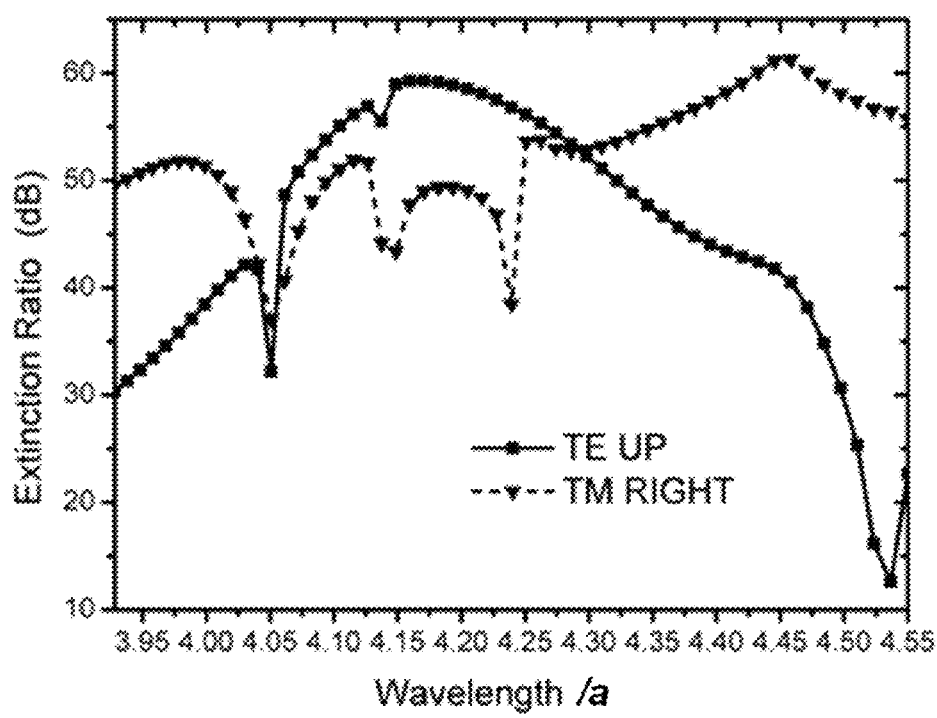

FIG. 3 is the extinction ratio versus wavelength in the range of the photonic bandgap for respective channels of the T-shape polarization beam splitter based on photonic crystal waveguides according to the present invention.

Figure 4:
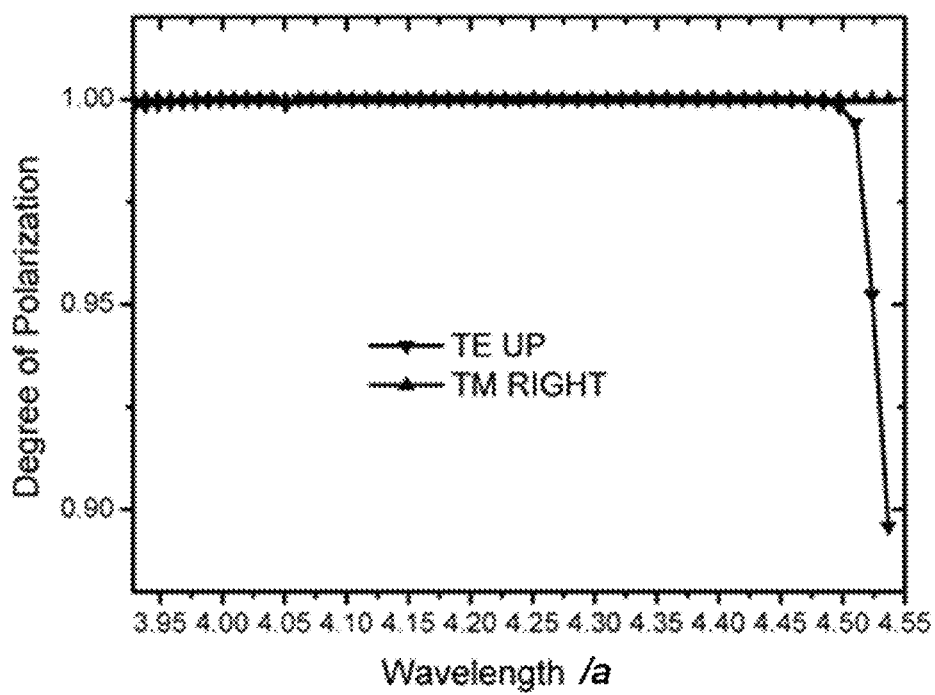

FIG. 4 is the degree of polarization versus wavelength in the range of the photonic bandgap for respective channels of the T-shape polarization beam splitter based on photonic crystal waveguides according to the present invention.

Figure 5:
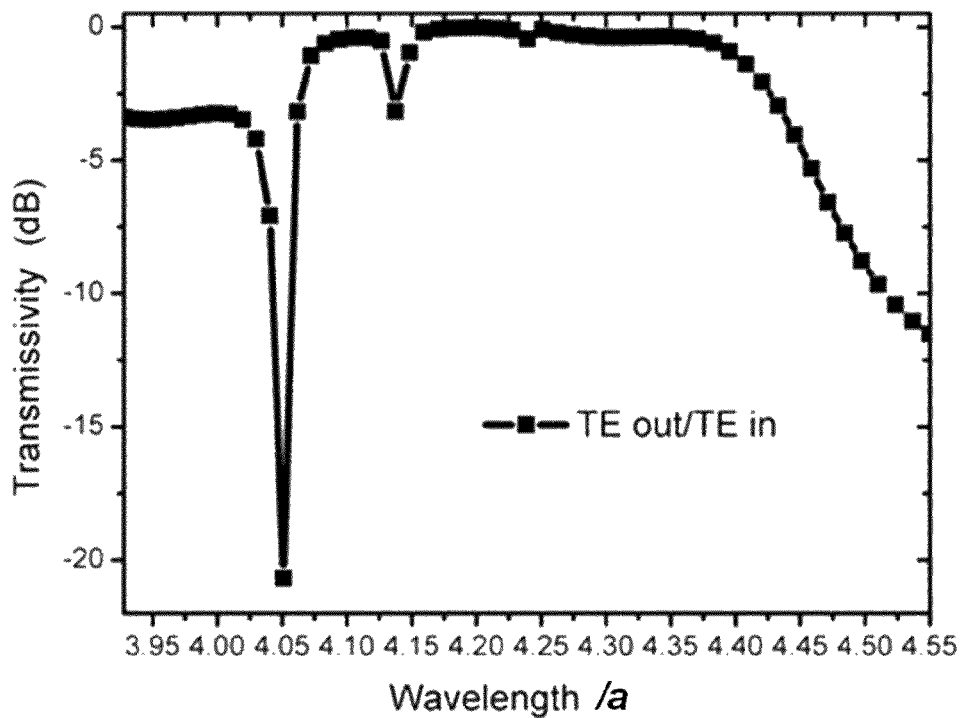

FIG. 5 is the transmittance versus wavelength in the photonic bandgap for TE light in the upper channel of the T-shape polarization beam splitter based on photonic crystal waveguides according to the present invention.

Figure 6:
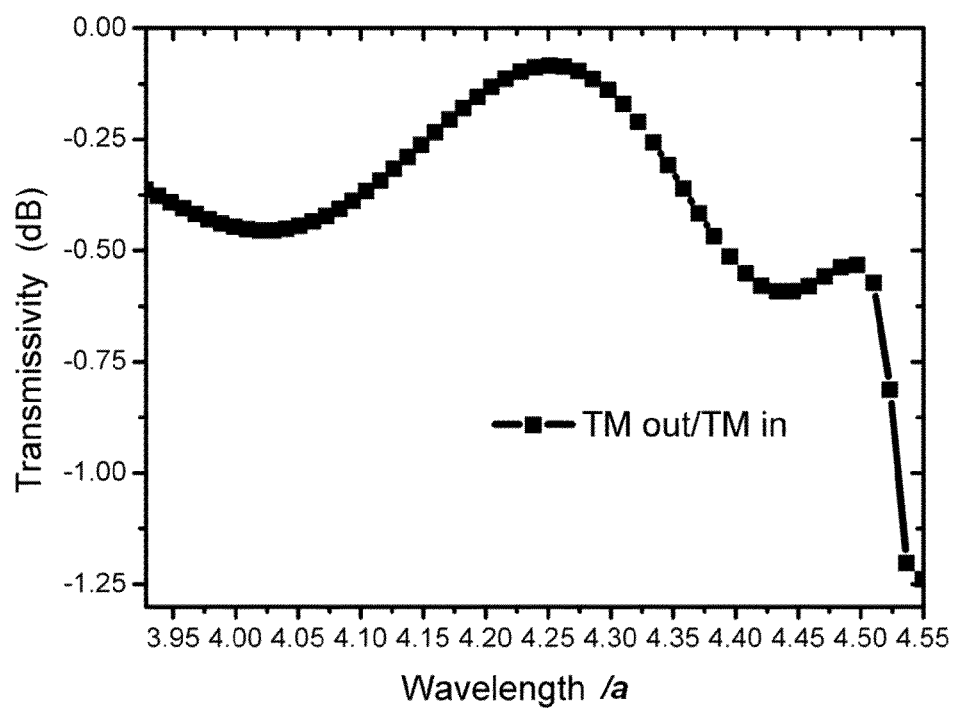

FIG. 6 is the transmittance versus wavelength in the photonic bandgap for TM light in the right channel of the T-shape polarization beam splitter based on photonic crystal waveguides according to the present invention.

Figure 7:
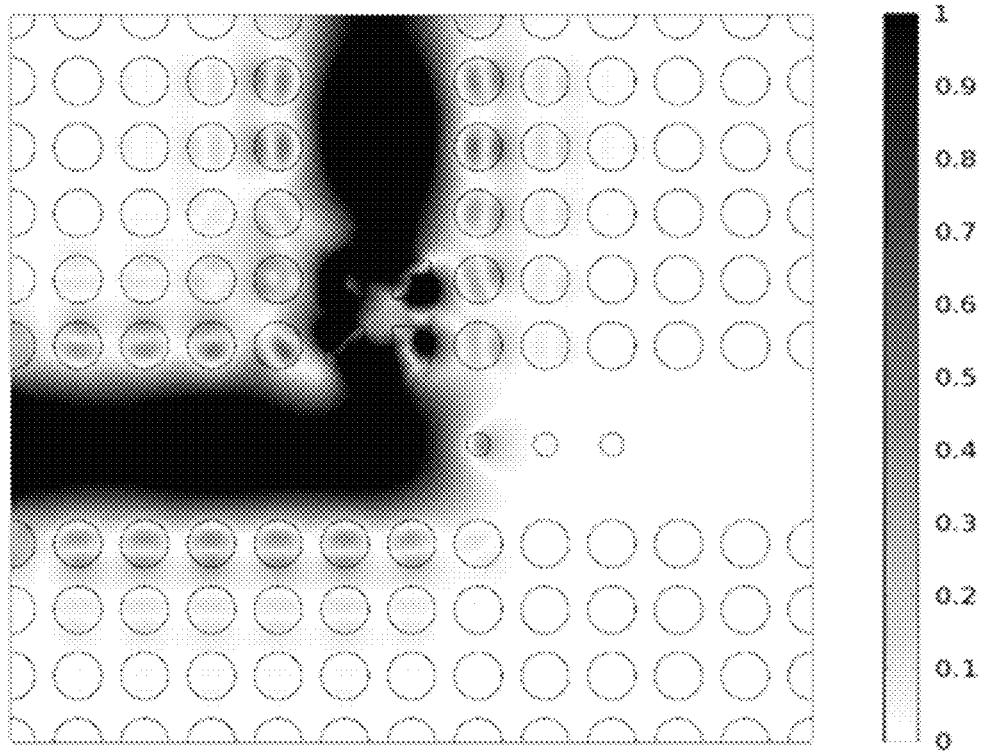

FIG. 7 is the simulated electric field distribution for TE input.

Figure 8:
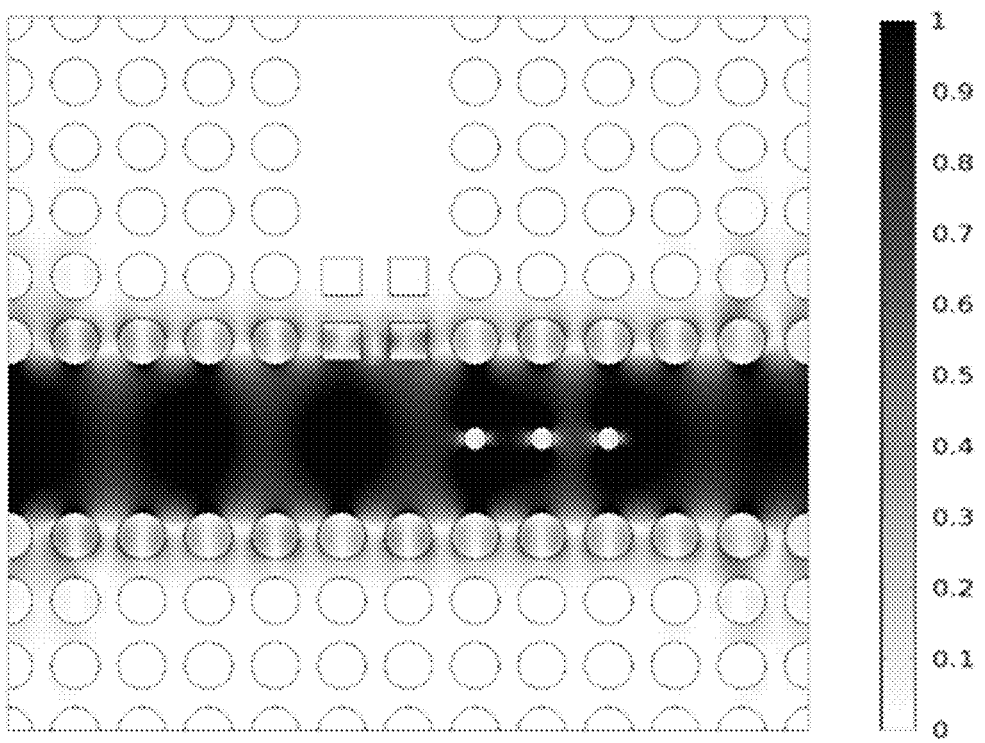

FIG. 8 is the simulated magnetic field distribution for TM input.

DETAILED DESCRIPTION OF THE PREFERRED EMBODIMENTS

The dielectric material in the principle introduction and the embodiments of the present invention is Te dielectric rod as an example. Tellurium is a uniaxial positive, crystal, $n_o$=4.8, $n_e$=6.2. For the c-axis and the dielectric rod axis being in the same direction, complete photonic bandgap can be obtained by the plane wave expansion, For square lattice photonic crystal with a lattice constant of a, and the radius thereof is 0.3568 a, the photonic bandgap is 3.928 to 4.550 ($\omega a/2\pi c$), and the light wave with any frequency therein will be confined in the waveguide.

In the present invention, the dielectric defect rods are introduced in the waveguides, such that the equivalent refractive indexes of the dielectric defect rods for light waves with different polarization states ace different, thus the dielectric defect rods can result in the wave in one polarization state to be totally reflected and the wave in another polarization state to be totally transmitted. The dielectric defect rods having different performance for different polarization states are applied near the end surfaces of the waveguides that output waves, and thus the separation of the light waves with different polarizations can be realized.

Figure 1:
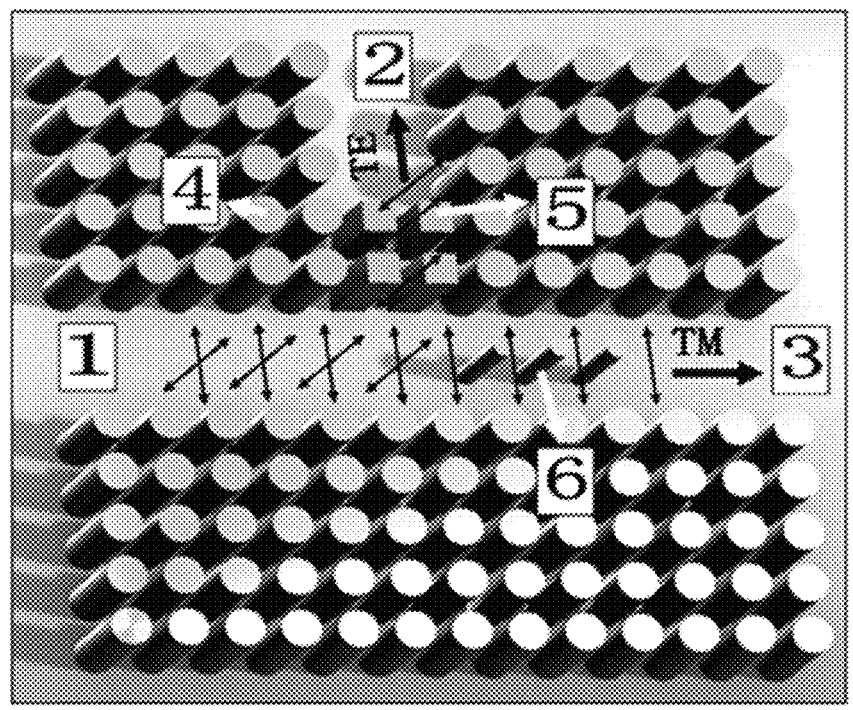
FIG. 1 is the schematic diagram of Tellurium photonic crystal and the waveguide used in the present invention.
Figure 2:
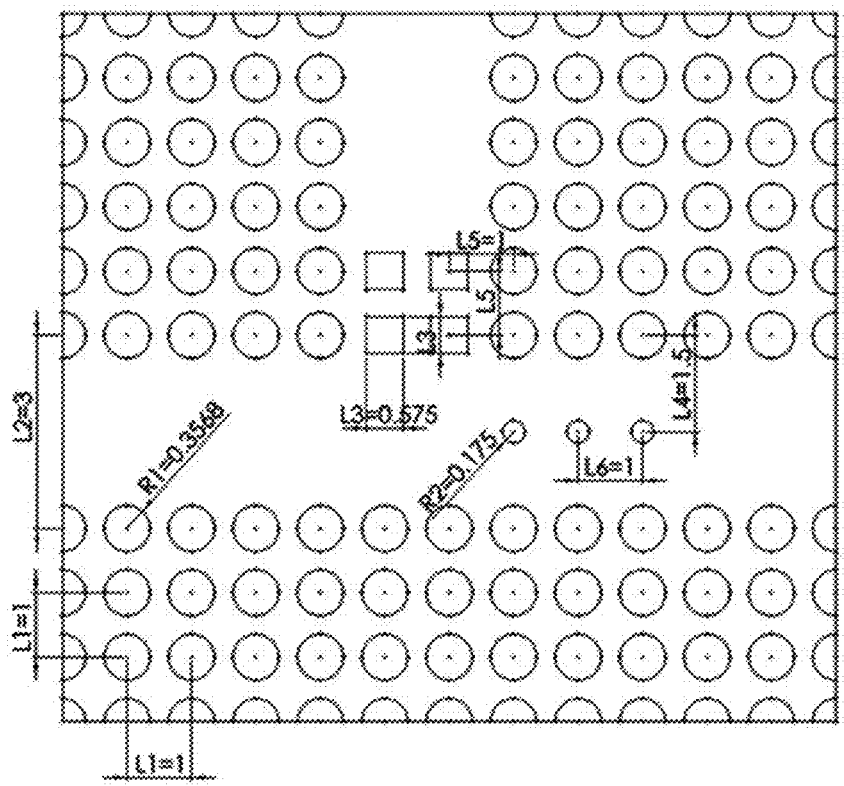
FIG. 2 is the schematic diagram showing the structure of the T-shape polarization beam splitter based on photonic crystal waveguides according to the present invention and parameter distribution diagram.

As shown in FIGS. 1 and 2, the tellurium dielectric photonic crystal in the present invention needs to delete two lines or two rows of dielectric rods to form the waveguides for guiding the waves, wherein, $L_1$=a, $L_2$=3 a, and the background dielectric rod radius is $R_1$=0.3568 a. Cartesian rectangular coordinate system is used in the description, wherein the positive direction of X axis is to the right horizontally; the positive direction of Y axis is vertically upward in the paper plane; and the positive direction of Z axis is outward vertically to the paper plane.

The equivalent refractive indexes of the defect rods are:

$$n_{eff}^{TE} = \sqrt{\varepsilon_{eff}^{TE}}, \varepsilon_{eff}^{TE} = \frac{\int_\Omega \varepsilon_e \cdot E_z^2 d\Omega}{\int_\Omega E_z^2 d\Omega}, \varepsilon_e = n_e^2, \quad (1)$$

$$n_{eff}^{TM} = \sqrt{\varepsilon_{eff}^{TM}}, \varepsilon_{eff}^{TM} = \frac{\int_\Omega \varepsilon_o \cdot (E_x^2 + E_y^2) d\Omega}{\int_\Omega (E_x^2 + E_y^2) d\Omega}, \varepsilon_o = n_o^2, \quad (2)$$

In the equation, $n_{eff}^{TE}$ and $n_{eff}^{TM}$ represent the equivalent refractive indexes for TE and TM lights, respectively, and $E_x$, $E_y$ and $E_z$ are the x, y, z components of the electric field, respectively.

The reflection ratio (R) and the transmissivity (T) of the light wave in the waveguide due to the defect rods can be expressed as:

$$R_{TE} = \left(\frac{n_{eff}^{TE} - 1}{n_{eff}^{TE} + 1}\right)^2, \quad (3)$$

$$T_{TE} = \frac{4n_{eff}^{TE}}{(n_{eff}^{TE} + 1)^2},$$

$$R_{TM} = \left(\frac{n_{eff}^{TM} - 1}{n_{eff}^{TM} + 1}\right)^2, \quad (4)$$

$$T_{TM} = \frac{4n_{eff}^{TM}}{(n_{eff}^{TM} + 1)^2}.$$

By adjusting the size of the round dielectric defect rods, we can have $R_{TE}\approx1$, $T_{TE}\approx0$ and $R_{TM}\approx0$, $T_{TM}\approx1$, i.e., realizing the function of isolating TE light and transmitting TM light.

By numerical scanning and calculation, for the TM wave having a maximal value of extinction ratio, the radius of the round dielectric rod is $$R_2=0.175 \text{ a}. \quad (5)$$

In this case, we have $n_{eff}^{TE} \to \infty$, $n_{eff}^{TM} \to 1$.

Meanwhile, by adjusting the side length of the square dielectric defect rods we can have $R_{TE}\approx0$, $T_{TE}\approx1$ and $R_{TM}\approx1$, $T_{TM}\approx0$, and thus the function of isolating TM light and transmitting TE light is realized. (Here, the direction of the e-axis of the square dielectric defect rods is perpendicular to the propagation direction of the wave.)

By numerical value scanning and calculation, for TE wave with a maximal value of extinction ratio, the side length of the square dielectric defect rods is $$L_3=0.575 \text{ a}. \quad (6)$$

In this case, we have $n_{eff}^{TE} \to 1$, $n_{eff}^{TM} \to \infty$.

The centers of the three round dielectric defect rods in the horizontal waveguide transmitting TM waves are located on the horizontal center axis of the waveguide and the distances between the round dielectric defect rod centers thereof and the nearest upper or lower dielectric rods on the waveguide walls are $$L_4=1.5 \text{ a}. \quad (7)$$

The vertical positions of the centers of the four square dielectric defect rods in the vertical waveguide transmitting TE waves are the same as the vertical positions of the centers of the corresponding background dielectric rods; the horizontal distances between the centers of the nearest square defect rods and the nearest right or left background dielectric rods on the waveguide walls are $$L_5=a. \quad (8)$$

The direction of the e-axis of the four square dielectric defect rods in the vertical waveguide transmitting TE wave is different from that of the round dielectric defect rods and the background dielectric rods, the e-axis of the square dielectric defect rods is in the horizontal X-axis direction, while the c-axis of the round dielectric defect rods and the background rods are in the Z-axis direction.

As shown in FIGS. 1 and 2, in the four square dielectric defect rods in the waveguide transmitting TE waves, the center of each square dielectric rod is coincident with the center of the background round dielectric rod which is originally deleted to form the waveguide, therefore, the distance between any two adjacent square dielectric defect rods is a, the distance between the centers of square dielectric defect rods and that of the nearest background dielectric rod is also a, and the side length of each square dielectric defect rod is 0.1575 a. The optical axis of the four square tellurium dielectric defect rods is orthogonal to the optical axis of the background cylinder tellurium dielectric rods in the photonic crystal, and the direction of the optical axis of the square dielectric defect rods is orthogonal to the upper and lower sides of the square dielectric defect rods in FIGS. 1 and 2, and parallel to the right and left sides of the square dielectric defect rods thereof.

Meanwhile, for the three round dielectric defect rods at the horizontal waveguide for transmitting TM waves, the center of each round dielectric defect rod is coincident with the center of the round dielectric rod which is originally deleted to form the waveguide, therefore, the distance between any two adjacent round dielectric defect rods is a, the distance between the center of the nearest round dielectric defect rod and that of the nearest background dielectric rod is also a, and each radius of the round dielectric defect rods is 0.175 a. The optical axis of the three round tellurium dielectric defect rods is consistent with the optical axis of the background cylinder tellurium dielectric rods in the photonic crystal.

For the waveguides with the above defects introduced, the incident signal port is at the position "1" in FIG. 1. Light is propagated in the waveguide formed by the array of "4" dielectric rods, after the light arrives at the defect position "2", the TE wave is totally transmitted, and the TM wave is totally isolated. After the light arrives at the defect position "6", the TM wave is totally transmitted, and the TE wave is totally isolated. At last, the TE wave is outputted at the position "2" of the output port, and the TM wave is outputted at the position "3" of the output port. For different input signals, the selection functions are provided as follows:
 (1) For incident light of mixed TE and TM waves, the TE wave is totally guided into the upper port of the vertical waveguide, and the TM wave is totally guided into the right-hand side of the horizontal waveguide;
 (2) For the incident light of only TE wave, the TE wave is exported from the upper port of the vertical waveguide.
 (3) For the incident light of only TM wave, the TM wave is exported from the right-hand side of the horizontal waveguide.

The lattice constant and the operation wavelength can be determined by the following ways. According to the refractive index curve of the uniaxial crystal tellurium, tellurium has a relative stable refractive index in the wavelength range between 3.5 a~35 a. By the equation, $$f = \frac{\omega a}{2\pi c} = \frac{a}{\lambda}, \quad (9)$$

wherein f is the photonic bandgap frequency, and the normalized photonic bandgap frequency range of the square lattice tellurium photonic crystal in the present invention, $$f = 0.21977 \sim 0.25458, \quad (10)$$

the corresponding photonic bandgap wavelength range is calculated as:

$$\lambda = 3.928 \text{ a} \sim 4.55 \text{ a}. \quad (11)$$

Thus, it can be seen that, by varying the value of the lattice constant a, the required wavelength λ proportional to the lattice constant can be acquired.

The extinction ratio in the waveguide is defined as:

$$\text{Extinction } Ratio_{TE} = 10 \times \log_{10}\left(\frac{I_{TE}}{I_{TM}}\right), \text{ for } TE \text{ wave}, \quad (12)$$

$$\text{Extinction } Ratio_{TM} = 10 \times \log_{10}\left(\frac{I_{TM}}{I_{TE}}\right), \text{ for } TM \text{ wave}. \quad (13)$$

The degree of polarization is defined as:

$$\text{Degree of } Polarization_{TE} = \left|\frac{I_{TE} - I_{TM}}{I_{TE} + I_{TM}}\right|, \text{ for } TE \text{ wave}, \quad (14)$$

$$\text{Degree of } Polarization_{TM} = \left|\frac{I_{TM} - I_{TE}}{I_{TM} + I_{TE}}\right|, \text{ for } TM \text{ wave}. \quad (15)$$

Through FIG. 3, it can be found that for the operating wavelength in 3.93 a-4.5 a, the extinction ratios for TE and TM waves are greater than 25 dB, and it can be observed from FIG. 4 that the degree of polarization is almost 1 for both the TE and TM waves, and the photonic bandgap wavelength range of the photonic crystal is 3.928 a-4.55 a, which shows that the present invention has a large operating wavelength range, which is not available for other polarization beam splitting devices based on coupling of cavity modes.

FIGS. 5 and 6 respectively show the transmittance of the TE wave in the upper waveguide and that of the TM wave in the right-hand-side waveguide. It can be seen from FIG. 6 that, it has a good transmittance for the TM wave in the whole photonic bandgap range, and there is a worst transmission of −1.24 dB at the relative wavelength close to 4.55 a. And it can be seen from FIG. 5 that, in the two wavelength bands of 4.072 a-4.129 a and 4.147 a-4.4 a, the transmittances are the best, and in the band of 4.129 a-4.147 a, there is a minimal TE wave transmittance of −20.7 dB. Therefore, by considering FIGS. 3-6 together, it can be derived that the best operating wavelength bands for the present invention are 4.072 a-4.129 a and 4.147 a-4.4 a. In the two wavelength bands, extremely high extinction ratio and transmittance can be achieved.

FIGS. 7 and 8 are the light field diagrams calculated by finite element software COMSOL for the operating wavelength of 4.1 a in free space. It can be observed that the TE and TM waves are propagated efficiently in their own channel, respectively, and have high extinction ratios.

The present invention can effectively separate light waves comprising both TE and TM components in a small volume, or directionally guide the light wave comprising only TE or TM component. The present invention has a high extinction ratio and meanwhile has a broad operating wavelength band, which allows the pulses with a certain frequency spectrum width, or Gauss-pulse light, or light with different wavelengths, or light with multiple wavelengths to operate at the same time, and is useful in practice.

In the present invention, both TE and TM light waves can propagate in a fundamental mode in the waveguides formed by deleting two lines or two rows at the center in a square lattice photonic crystal made of uniaxial positive crystal tellurium rods. The e-light optical axis of each of the background tellurium dielectric rods in the photonic crystal must satisfy that it is consistent with the direction of the axis of the cylinder. The operating wavelength can be adjusted by the lattice constant of the photonic crystal.

The above embodiment and application range of the present invention can be improved, and should not be understood as the limit of the invention.

The invention claimed is:

1. A T-shape polarization beam splitter based on photonic crystal waveguides, comprising waveguides formed in a photonic crystal with a complete photonic bandgap, wherein after the incident wave with any polarization direction is inputted into the polarization beam splitter via the input port of the photonic crystal waveguide, TE component is outputted from the TE output port, while the TM component is outputted from TM output port of the beam splitter, wherein sais photonic crystal waveguide is provided with the waveguide-defect dielectric rods, the defect dielectric rods are four square shaped and three circular shaped defect dielectric rods: the four square dielectric defect rods in the waveguide transmitting TE waves, in which the center of each square shaped dielectric rod coincides with the center of circular shaped dielectric rod which was originally deleted in forming the waveguide; the three round dielectric defect rods at the horizontal waveguide for transmitting TM waves, in which the center of each circular shaped dielectric rod coincides with the center of circular shaped dielectric rod which was originally deleted in forming the waveguide.

2. The T-shape polarization beam splitter based on photonic crystal waveguides according to claim 1, wherein the refractive index for the e-light is higher than that for the o-light in the dielectric defect rods in the waveguides, and the optical axis of the square dielectric defect dielectric rods in the waveguides is parallel to the photonic crystal waveguide plane and orthogonal to the propagating direction of the wave.

3. The T-shape polarization beam splitter based on photonic crystal waveguides according to claim 2, wherein the direction of the optical axis of the round dielectric defect rods in the waveguide is consistent with that of the background dielectric rods.

4. The T-shape polarization beam splitter based on photonic crystal waveguides according to claim wherein the photonic crystal waveguide is a two-dimensional photonic crystal waveguide, and includes a two-dimensional photonic crystal waveguide with tellurium dielectric material, a two-dimensional photonic crystal waveguide with honeycomb structure, a two-dimensional photonic crystal waveguide with triangular lattice, or two-dimensional photonic crystal waveguides with various irregular shapes.

5. The T-shape polarization beam splitter based on photonic crystal waveguides according to claim 1, wherein the photonic crystal waveguide has a structure formed by removing 1 or 2 or 3 or 4 rows of the dielectric rods from the photonic crystal.

6. The T-shape polarization beam. splitter based on photonic crystal waveguides des according to claim 1, wherein the photonic crystal waveguide plane is perpendicular to the axis of the background dielectric rods in the photonic crystal.

* * * * *